C. P. MADSEN.
ELECTRIC HEATER.
APPLICATION FILED MAR. 4, 1911.
1,023,475.
Patented Apr. 16, 1912.
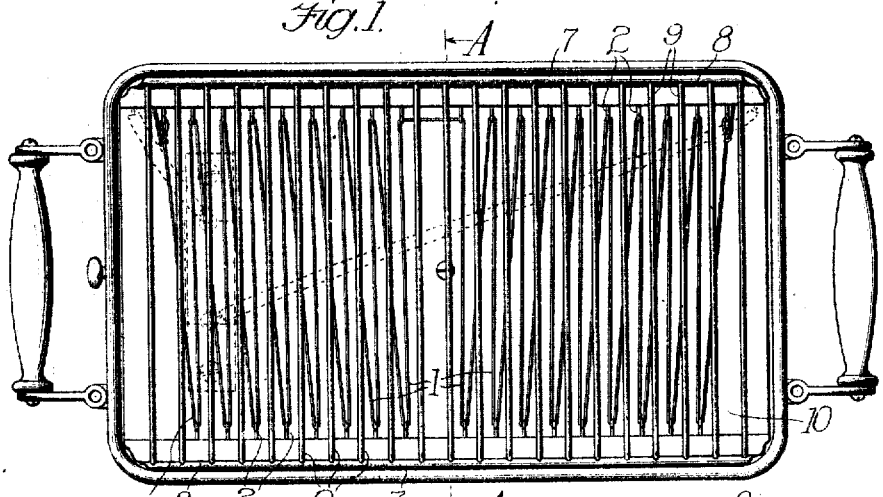
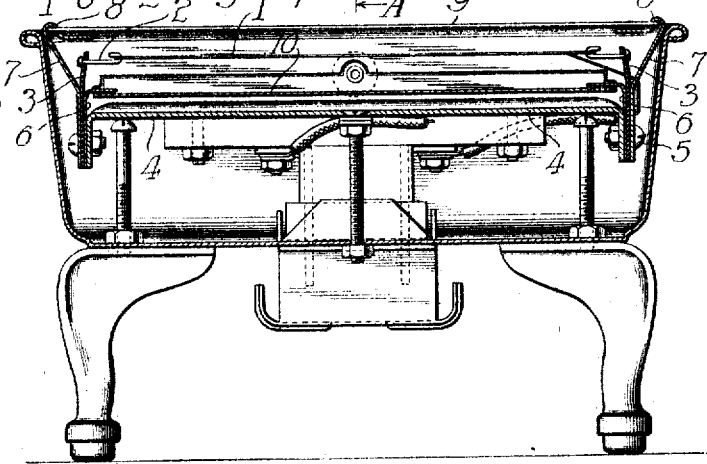
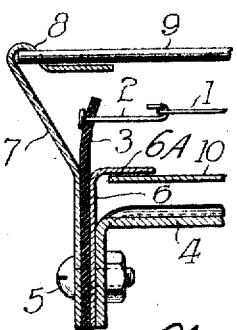
Witnesses
Martin H. Olsen
Edwin Phelps
Inventor
Charles P. Madsen,
By Kummler & Kummler
Attys

UNITED STATES PATENT OFFICE.

CHARLES P. MADSEN, OF CHICAGO, ILLINOIS, ASSIGNOR, BY MESNE ASSIGNMENTS, TO PELOUZE MANUFACTURING COMPANY, OF CHICAGO, ILLINOIS, A CORPORATION OF ILLINOIS.

ELECTRIC HEATER.

1,023,475. Specification of Letters Patent. Patented Apr. 16, 1912.

Application filed March 4, 1911. Serial No. 612,425.

*To all whom it may concern:*

Be it known that I, CHARLES P. MADSEN, a citizen of the United States of America, and a resident of Chicago, county of Cook, State of Illinois, have invented certain new and useful Improvements in Electric Heaters, of which the following is a specification.

This heater belongs to that class of heaters in which the heat generated is transferred by direct radiation in contra-distinction to those in which it is transferred mainly by conduction. I have discovered that in heat generators of this type it is necessary to keep all bodies of matter away from contact with the heat generating member. It is well known that the difference in heat conducting power of different bodies of matter is not great; that all bodies of matter will conduct to some extent. I have found that the high temperatures necessary for some kinds of work, to permit of sufficient heat conduction, will render the apparatus very inefficient; and that, therefore, any attempts to insulate the heat from going in any direction are largely futile. Furthermore, I have found that those bodies which are assumed to be non-conductors of heat have an enormous thermal capacity, and that, while they may not transfer heat readily from a generating body to a third body, they nevertheless prevent the rapid transfer of heat from the generating member to the points desired until their own temperature is raised to a considerable degree. This makes a slow operating apparatus. I have found, therefore, that it is necessary to suspend such conductors in a single plane, without contact with any other body of matter than air. Two embodiments of generating heat in conformity with these discoveries are illustrated in my applications, Serial Nos. 571,234 and 571,235. I find now that steel or any metallic spring will not withstand the temperature conditions and maintain the properties necessary to perform the functions required. I have discovered that there are many insulating compounds which possess sufficient resiliency and elasticity to give the required amount of motion under the necessary operating conditions. What I therefore claim as new is the use of an electrically insulating substance, as a spring or tension member, for the purpose of holding or maintaining a conductor or series of conductors taut or under tension in any plane under conditions of changing temperature. For this purpose I prefer to use mica. Other substances, however, can be used equally well. A thin plate of glass would answer under some conditions. I have also found a built up plate of asbestos paper made under heavy pressure to answer.

The main objects of this invention are to utilize those principles governing the most efficient generation of radiant energy electrically; to provide a construction which minimizes the conductivity and absorption of heat by other bodies of matter; and to provide a structure which will successfully maintain a radiant heat generator in one plane and in correct relationship to its surroundings.

A specific construction embodying this invention is illustrated in the accompanying drawings, in which—

Figure 1 is a top plan view of an electric heater. Fig. 2 is a transverse sectional view on the line A—A of Fig. 1. Fig. 3 is an enlarged sectional detail showing the manner of mounting the heating element.

In the construction shown, the winding or resistance member consists of a reflex resistance wire 1 supported at each bend by a hook 2. These series of hooks are suspended through holes in the insulating tension member 3. This tension member 3 is in turn mechanically fastened to a comparatively rigid base 4, either of metal or non-conducting compound, by a bolt 5. The stress of the tension member 3 is so adjusted that it keeps the wires 1 under stress when cold, and has sufficient moving power or resilience to take up the expansion of the resistance member 1 as its temperature rises, and at the same time keep it taut and in its original plane.

Coacting with and bolted to the insulating tension member 3 are two side bars 6 and 7 which serve as stiffeners and are adapted to modify the bending characteristic of the tension member 3 and produce a deflection somewhat similar to a volute spring. The inner side bar 6 is slightly curved away from the tension member, and has a stiffening edge 6^A which also acts as a separator. The outer side bar 7 has a similar contour where it coacts with the tension member 3, and at its upper edge forms a shelf 8 and support for the bars 9 which in turn form a food support spacing the food away from the resistance wires 1. It is evident, however, that this principle could be utilized in modified forms. The reflex resisters 1, instead of being supported by hooks 2 at each turn, could be bent around small projecting tongues or points punched in the mica plate. It is also evident that it is not necessary to be confined to one strip of mica plate on either side. The strip may be divided into any number of convenient members. In cases where the temperature rise of the conductor is not equal in its individual bends, it would be desirable to use an individual tongue or strip for each bend. The wire could be bent directly around the tongue or strip, or individual hooks could be used in individual tongues.

It is evident that if a reflector 10 be placed back of the heat generating members, the heating effect will be practically instantaneous, and at the same time, the construction eliminates danger of short circuiting or breaking the wire.

Although but one specific embodiment of this invention is herein shown and described, it will be understood that numerous details of the construction shown may be altered or omitted without departing from the spirit of this invention as defined by the following claims.

I claim:

1. In an electric heater, the combination of a heating element bent back and forth to provide a plurality of straight parts lying in one plane, and a resilient tension member of insulating material connected to said element and adapted to maintain said heating element taut independent of the expansion of said element.

2. In an electric heater, the combination of a heating element bent back and forth to provide a plurality of straight parts lying in one plane and a plurality of tension members of resilient insulating material connected to said heating element and adapted to maintain said heating element taut independent of the expansion of said element.

3. In an electric heater, the combination of a heating element, a tension member of insulating material, means coacting with said tension member and adapted to control the deflection characteristic of said tension member, said tension member being adapted to hold said heating element in alinement.

4. In an electric heater, the combination of a heating element, a tension member of insulating material, means for connecting said element with said tension member, said tension member being adapted to maintain said heating element taut under normal operating conditions, and means coacting with said tension member adapted to produce a volute spring characteristic.

5. In an electric heater, the combination of a heating element, and a strip of resilient insulating material mounted transversely to said heating element and adapted to hold said heating element taut during operation.

6. In an electric heater, the combination of a heating element, and a strip of mica disposed transversely to said heating element and adapted by its own resilience to maintain said heating element under tension independent of expansion.

7. In an electric heater, the combination of a heating element, and a strip of mica, having one edge rigidly supported and the other edge connected to said heating element, disposed transversely to said heating element and adapted by its own resilience to maintain said heating element under tension independent of expansion.

Signed at Chicago this 1st day of March 1911.

CHARLES P. MADSEN.

Witnesses:
MARY M. DILLMAN,
PHILIP B. WOODWORTH.